(12) United States Patent
Wagle et al.

(10) Patent No.: US 12,552,722 B2
(45) Date of Patent: Feb. 17, 2026

(54) PROCESS FOR PRODUCING A METAL-CERAMIC SUBSTRATE, AND A METAL-CERAMIC SUBSTRATE PRODUCED USING SUCH A METHOD

(71) Applicant: Rogers Germany GmbH, Eschenbach (DE)

(72) Inventors: Fabian Wagle, Bayreuth (DE); Stefan Britting, Schnaitach (DE); Tilo Welker, Neuhaus (DE)

(73) Assignee: ROGERS GERMANY GMBH, Eschenbach (DE)

( * ) Notice: Subject to any disclaimer, the term of this patent is extended or adjusted under 35 U.S.C. 154(b) by 110 days.

(21) Appl. No.: 18/018,280

(22) PCT Filed: Jul. 30, 2021

(86) PCT No.: PCT/EP2021/071428
§ 371 (c)(1),
(2) Date: Jan. 27, 2023

(87) PCT Pub. No.: WO2022/023544
PCT Pub. Date: Feb. 3, 2022

(65) Prior Publication Data
US 2023/0286872 A1  Sep. 14, 2023

(30) Foreign Application Priority Data
Jul. 30, 2020 (DE) .......................... 102020120189.3

(51) Int. Cl.
*B32B 41/00* (2006.01)
*C04B 37/02* (2006.01)

(52) U.S. Cl.
CPC ...... *C04B 37/023* (2013.01); *C04B 2237/706* (2013.01); *C04B 2237/74* (2013.01); *C04B 2237/84* (2013.01)

(58) Field of Classification Search
CPC ............ C04B 37/023; C04B 2237/706; C04B 2237/74; C04B 2237/84; C04B 37/021;
(Continued)

(56) References Cited

U.S. PATENT DOCUMENTS 7,398,912 B2  7/2008  Shinkai et al.
8,749,052 B2  6/2014  Schulz-Harder et al.
(Continued)

FOREIGN PATENT DOCUMENTS

CN  102484104 A  5/2012
CN  105900222 A  8/2016
(Continued)

OTHER PUBLICATIONS

International Search Report and Written Opinion dated Nov. 17, 2021 in PCT/EP2021/071428 filed Jul. 30, 2021 (in German).
(Continued)

*Primary Examiner* — Michael N Orlando
*Assistant Examiner* — Joshel Rivera
(74) *Attorney, Agent, or Firm* — CANTOR COLBURN LLP

(57) ABSTRACT

The invention relates to a process for producing a metal-ceramic substrate (1), comprising: —providing a ceramic element (10), a metal ply (40) and at least one metal layer (30), —forming an ensemble (18) of the ceramic element (10), the metal ply (40) and the at least one metal layer (30), —forming a gas-tight container (30) surrounding the ceramic element (10), wherein the at least one metal layer (30) is arranged between the ceramic element (10) and the metal ply (40) in the container, and—forming the metal-ceramic substrate (1) by hot isostatic pressing.

15 Claims, 4 Drawing Sheets

(58) Field of Classification Search
CPC ...... C04B 2235/6584; C04B 2237/708; C04B 2237/72; C04B 2237/86; C04B 35/6455; C04B 37/026
USPC .................. 156/60, 64, 350, 351, 378, 379
See application file for complete search history.

(56) References Cited

U.S. PATENT DOCUMENTS

| | | | |
|---|---|---|---|
| 10,351,477 | B2 | 7/2019 | Meyer et al. |
| 10,988,418 | B2 | 4/2021 | Zeiger et al. |
| 11,845,700 | B2 | 12/2023 | Engel et al. |
| 2014/0345914 | A1 | 11/2014 | Meyer et al. |
| 2016/0181123 | A1 | 6/2016 | Terasaki |
| 2016/0304405 | A1* | 10/2016 | Meyer ................. H01L 21/4857 |

FOREIGN PATENT DOCUMENTS

| | | |
|---|---|---|
| DE | 19927046 A1 | 12/2000 |
| DE | 102009033029 A1 | 1/2011 |
| DE | 102012206276 A1 | 11/2012 |
| DE | 102010020900 C5 | 6/2013 |
| DE | 102012212249 A1 | 1/2014 |
| DE | 102013104739 A1 | 9/2014 |
| DE | 102015224464 A1 | 6/2017 |
| DE | 102013113734 B4 | 3/2018 |
| DE | 102017128316 B4 | 12/2019 |
| DE | 102017128308 B4 | 4/2020 |
| EP | 3290399 B1 * | 3/2022 ......... C04B 35/6455 |
| JP | H0794631 A | 4/1995 |
| JP | 2003039539 A | 2/2003 |
| JP | 2004203706 A | 7/2004 |
| JP | 4325470 B2 | 9/2009 |
| JP | 2015070098 A | 4/2015 |
| JP | 6499545 B2 | 3/2019 |
| JP | 2020107671 A | 7/2020 |

OTHER PUBLICATIONS

International Search Report dated Nov. 17, 2021 in PCT/EP2021/071428 filed Jul. 30, 2021 (in English).

* cited by examiner

PROCESS FOR PRODUCING A METAL-CERAMIC SUBSTRATE, AND A METAL-CERAMIC SUBSTRATE PRODUCED USING SUCH A METHOD

CROSS REFERENCE TO RELATED APPLICATIONS

This application is a National Stage application of PCT/EP2021/071428, filed Jul. 30, 2021, which claims the benefit of German Application No. 102020120189.3, filed Jul. 30, 2020, both of which are incorporated by reference in their entirety herein.

BACKGROUND

The present invention relates to a method for producing a metal-ceramic substrate and to a metal-ceramic substrate produced using such a method.

Metal-ceramic substrates are well known from prior art, for example as printed circuit boards or circuit boards, for example from DE 10 2013 104 739 A1, DE 19 927 046 B4 and DE 10 2009 033 029 A1. Typically, conductor junction areas for electrical components and conductor tracks are arranged on one component side of the metal-ceramic substrate to interconnect the electrical components and the conductor tracks for forming electrical circuits. Essential components of the metal-ceramic substrates are an insulation layer, which is preferably made of a ceramic, and at least one metal layer joined to the insulation layer. Due to their comparatively high insulation strengths, insulation layers made of ceramics have been found to be particularly advantageous in power electronics. By patterning the metal layer, conductor tracks and/or conductor junction areas for the electrical components may then be realized.

The prerequisite for providing such a metal-ceramic substrate is permanent binding between the metal layer and the ceramic layer. In addition to a so-called direct metal joining method, i.e., a DCB or DAB method, it is known from prior art to join the metal layer to the ceramic layer using a solder material.

By an active soldering method, e.g., for joining metal layers or metal foils, in particular also copper layers or copper foils, to ceramic material, a method is meant which is specially used for producing metal-ceramic substrates. This method provides a bond between a metal foil, for example a copper foil, and a ceramic substrate, for example an aluminum nitride ceramic, produced at a temperature between about 650-1000° C. using hard solder which, in addition to a main component such as copper, silver and/or gold, also contains an active metal. This active metal, which is for example at least one element selected from the group consisting of Hf, Ti, Zr, Nb, Ce, establishes a bond between the solder and the ceramic by chemical reaction, while the bond between the solder and the metal is a hard solder metal bond.

Furthermore, a method is known, for example from DE 10 2013 113 734 B4 and JP 4 325 470, in which hot isostatic pressing is used to join a metal layer to a ceramic layer for the purpose of forming a metal-ceramic substrate. Hot isostatic pressing is also used for post-treatment to reduce a number of voids formed during joining when using a soldering method or a direct metal joining method.

SUMMARY

Starting from prior art, it is the object of the present invention to provide a method for producing metal-ceramic substrates that is further improved compared to known methods, in particular with regard to successfully joining the metal to the ceramic preferably in a void-free, energy-saving and process-safe manner.

This object will be achieved by providing a method for producing a metal-ceramic substrate according to claim 1 and a metal-ceramic substrate according to claim 15. Further embodiments will arise from the description.

According to a first aspect of the present invention, a method for producing a metal-ceramic substrate will be provide, comprising:
 providing a ceramic element, a metal ply and at least one metal layer,
 forming an ensemble of the ceramic element, the metal ply and the at least one metal layer,
 forming a gas-tight container surrounding the ceramic element, wherein the at least one metal layer is arranged between the ceramic element and the metal ply in the container, and
 forming the metal-ceramic substrate by hot isostatic pressing.

BRIEF DESCRIPTION OF THE DRAWINGS

Further advantages and features will become apparent from the following description of preferred embodiments of the object according to the invention, while reference will be made to the accompanying figures, wherein.

DETAILED DESCRIPTION

Figure 1A:
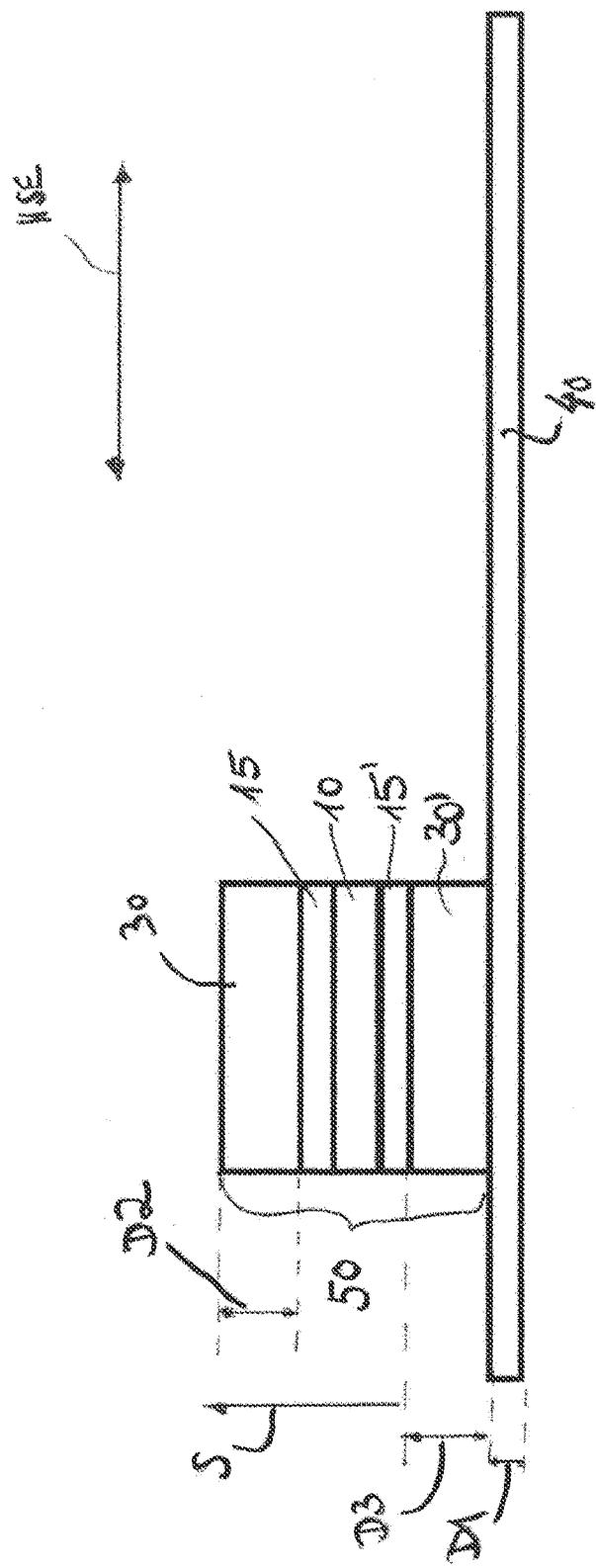
FIGS. 1a to 1e: illustrate a method for producing a metal-ceramic substrate according to a first example embodiment of the present invention.

Compared to methods known from prior art, according to the invention, the at least one metal layer is placed between the metal ply and the ceramic element, in addition to the metal ply, and then the metal ply, the at least one metal layer and the ceramic element are joined together. In other words, an additional metal layer is introduced into the container which, together with the metal ply, becomes part of the metallization formed on the fabricated metal-ceramic substrate during the hot isostatic pressing process. The use of such an arrangement, in which an additional metal layer is introduced between the metal ply and the ceramic element, in particular allows greater freedom in producing the containers and also allows the freedom to be able to adjust properties of the subsequent metallizations on the manufactured metal-ceramic substrate as desired.

It is preferred that in hot isostatic pressing, the container, in particular the metal container, is subjected, in a heating and pressure device, to a gas pressure of between 100 and 2000 bar, preferably 150 bar and 1200 bar and particularly preferably 300 and 1000 bar and a process temperature of 300° C. up to a melting temperature of the metal ply and/or an additional metal ply, in particular up to a temperature below the melting temperature of the metal ply and/or the additional metal ply. Advantageously, it has been found that it is thus possible to join a metal layer, i.e., the at least one metal layer and/or the metal ply and/or the additional metal ply of the metal container, to the ceramic element without reaching the required temperatures of a direct metal joining process, for example a DCB process or a DAB process, and/or without a solder base material used in active soldering. In addition, taking advantage of or using an appropriate gas pressure allows the possibility that a metal-ceramic substrate is produced to be maximally void-free, i.e., without gas inclusions between the metal layer and the ceramic element. In particular, process parameters are used which are mentioned in DE 10 2013 113 734 A1 and to which explicit reference is herewith made in connection with hot isostatic pressing.

In particular, in hot isostatic pressing, heating is to be performed, in particular sintering and/or annealing is to performed, in which the metal ply and/or the additional metal ply of the metal container and/or the at least one metal layer, in particular the subsequent metallization of the metal-ceramic substrate, does not pass into the melt phase. Accordingly, lower temperatures than for a direct metal joining process, in particular a DCB process, are required for hot isostatic pressing. Using or making use of pressure in hot isostatic pressing also has proven to be advantageous because air inclusions or pores between the metal ply and/or the additional metal ply or the at least one metal layer on the one hand and the ceramic element on the other hand may be reduced as a result, wherein formation of blowholes may be reduced in frequency or may even be totally suppressed in the metal-ceramic substrate formed or fabricated. This has an advantageous effect on the quality of the bond between the at least one metal layer or the metal ply and/or additional metal ply of the metal container and the ceramic element. In particular, a "solid state diffusion bonding" (SDB) process will thus be realized.

Preferably, the metal-ceramic substrate is provided as a printed circuit board in which, in the fabricated state, the metallization joined to the ceramic element is patterned. For example, in addition to hot isostatic pressing, patterning, for example by laser, etching and/or mechanical machining is also to be performed for this purpose to form the metal-ceramic substrate, used to realize conductor tracks and/or junctions for electrical or electronic components. Preferably, a backside metallization and/or a cooling element is provided on the fabricated metal-ceramic substrate on the ceramic element, on the side opposite the metallization or the component metallization. The backside metallization preferably serves to counteract deflection and the cooling element serves to effectively dissipate heat arising during operation from electrical or electronic components joined to the printed circuit board or the metal-ceramic substrate.

Suitable materials for the metal ply, the additional metal ply and/or the at least one metal layer are copper, aluminum, molybdenum, tungsten and/or alloys thereof, such as CuZr, AlSi or AlMgSi, and laminates such as CuW, CuMo, CuAl and/or AlCu or MMC (metal matrix composite), such as CuW, CuMo or AlSiC. Furthermore, it is preferred that the metal ply, the additional metal ply and/or the at least one metal layer on the manufactured metal-ceramic substrate is surface modified, in particular as a component metallization. As a surface modification, for example, sealing with a noble metal, in particular silver and/or gold or (electroless) nickel or ENIG ("electroless nickel immersion gold"), or edge grouting on the metallization to suppress crack formation or expansion is conceivable. For example, the metal ply may also differ from the additional metal ply.

Preferably, the ceramic element comprises $Al_2O_3$, $Si_3N_4$, AlN, an HPSX ceramic (i.e., a ceramic having an $Al_2O_3$ matrix comprising an x percentage of $ZrO_2$, for example $Al_2O_3$ with 9% $ZrO_2$=HPS9 or $Al_2O_3$ with 25% $ZrO_2$=HPS25), SiC, BeO, MgO, high-density MgO (>90% of the theoretical density), TSZ (tetragonally stabilized zirconium oxide) as a material for the ceramic. In this context, it is also conceivable that the ceramic element is designed as a composite or hybrid ceramic in which, in order to combine various desired properties, a number of ceramic layers, each of which differs in terms of its material composition, are arranged one on top each other and joined together to form a ceramic element.

Preferably, the metal ply is to be thicker or thinner than the at least one metal layer or substantially is of equal thickness as the at least one metal layer, wherein preferably a ratio of a first thickness of the metal ply to a second thickness of the at least one metal layer assumes a value between 0.01 and 2, preferably between 0.1 and 2 and more preferably between 0.15 and 0.5 or 2. It has further been found that particularly good results have been obtained for first thicknesses between 0.2 and 0.3 mm, in particular when a ratio of a first thickness of the metal ply to a second thickness of the at least one metal layer assumes a value between 0.01 and 0.5, preferably between 0.1 and 0.5 and particularly preferably between 0.15 and 0.5 or 0.5. It has been found that the use of comparatively thin metal ply simplifies the manufacturing process, in particular the gas-tight sealing of the container, the gas-tight sealing being required for use or enabling of hot isostatic pressing. This in particular is different from such prior art processes in which appropriate sheet metals are bent to form the containers and will subsequently be welded to each other at their free ends.

In particular, when the metal-ceramic substrate is formed, an atmosphere free of oxygen is present in the container. Preferably, this will be accomplished by withdrawing oxygen from the container prior to sealing the container. For example, the container is evacuated and a vacuum is maintained during joining in the arrangement of metal layer, metal ply and ceramic element. In particular, there is a pressure in the container of less than 150 mbar, preferably less than 50 mbar and especially preferably less than 20 mbar.

Preferably, the first thickness (D1) assumes a value between 10 μm and 500 μm, preferably between 50 μm and 400 μm, and particularly preferably between 100 μm and 300 μm. Such thin first thicknesses have proven to be advantageous in particular because they allow the container to be closed more easily. Finally, they are easier to bend, for example when producing the container. Preferably, the first thickness is less than 100 μm, preferably less than 80 μm and particularly preferably less than 50 μm.

Preferably, the second thickness is provided to assume a value between 100 μm and 10,000 μm, preferably between 150 μm and 6,000 μm, and particularly preferably between 600 μm and 5,000 μm. Accordingly, comparatively thick, at least one, metal layer is used to form appropriately thick metallizations in the fabricated metal-ceramic substrate. Such thick metallizations have proven to be advantageous in that they already promote heat spreading within the metallizations to which the electrical or electronic components are joined. As a result, the dissipated heat can be distributed more evenly and thus may be withdrawn more efficiently. In this context, the process in which the at least one metal layer is introduced into the container, formed of the metal ply, has proven to be particularly advantageous, because the thickness ratios are allowed to be adjusted with particular ease as a result.

Preferably, the metal ply and the at least one metal layer are to be made of different metals or materials. For example, it is conceivable for the metal ply to be made of nickel, which creates a surface seal for the subsequent metallization already during the joining process. In addition, the use of two different materials will provide new overall properties for the metallization. This may open the way to new applicabilities for the metal-ceramic substrates formed in such a manner.

Preferably, a functional layer, in particular a functional layer serving as a diffusion barrier, is arranged between the at least one metal layer and the metal ply, preferably prior to forming or providing the container. In this case, an additional functional metal layer will be applied as an additional functional metal layer, which preferably serves as a diffusion barrier between the metal layer and the metal ply. This is, for example, a metal foil which has a thermomechanical expansion coefficient which differs from those of the at least one metal layer and/or the metal ply. It is also conceivable that the functional layer, for example in the form of a carbide, nitride and/or as a metal, is applied to the metal ply and/or the at least one metal layer, for example by means of a gas-physical deposition process, to be arranged between the metal ply and the at least one metal layer after forming the container. Furthermore, it is conceivable that a mixed layer comprising both metal and ceramic serves as a functional layer. For example, it may be a powder mixture comprising a metal powder, a ceramic powder and/or a metal oxide powder. Preferably, the powder mixture is formed of a hybrid powder formed, for example, using mechanofusion process and comprises powder particles in which metal and ceramic are integrated. In other words, metal and ceramic are fused into a common powder particle. Alternatively, it is conceivable to have a porous metal-ceramic composite layer that is used as a functional layer.

The making use of the functional layer has been found to be particularly advantageous because it limits, for example, the characteristic grain growth of a layer, i.e., the grain growth of the metal ply or the at least one metal ply, to that layer, since the grains cannot grow through the functional layer which serves as a diffusion barrier. In the case of different metals in the at least one metal layer and the metal ply, for example, this prevents interdiffusion between them, which could negatively affect specific material properties of the respective layer, in particular thermal and electrical conductivity. Furthermore, formation of intermetallic phases between the at least one metal layer and the metal ply may thus be suppressed, should the respective layers be formed of specific, different metals, e.g., Cu and Ti. Metal layers as well as carbide or nitride bonds are suitable materials for the diffusion barrier. The thickness of the functional layer should be less than 100 µm, preferably less than 20 µm and particularly preferred less than 10 µm.

Furthermore, it is conceivable that a plurality of metal layers are provided which are arranged between the metal ply and the ceramic element, wherein a functional layer is arranged between individual metal layers of the plurality of metal layers as a supplement or an alternative to the functional layer between the metal ply and the metal layers.

Preferably, the metal ply and/or at least one metal layer are to be configured such that different grain sizes are present in the fabricated metal-ceramic substrate, preferably a first metal region formed of the metal ply having a smaller grain size than a second metal region formed of the at least one metal layer. In other words, in the fabricated metal-ceramic substrate, a smaller grain size is present in the metallization on the outside than in the metal region adjacent to the ceramic element and resulting from joining the at least one metal layer. Such impact on the grain sizes may be achieved either by temperature treatment carried out prior to providing the metal ply and the at least one metal layer, i.e., the at least one metal layer and the metal ply are subjected to different temperature treatments. Alternatively or additionally, it is conceivable that a proportion of foreign substances or impurities within the metal layer and/or the metal ply will be adjusted such that a specific grain size will be established in the joining process, which is performed under the action of temperature and pressure. In this way, the grain sizes may be adjusted appropriately, at least in their relative relationship to each other. This has proven to be particularly advantageous because a coarser grain size has a beneficial effect on the thermal shock resistance when it is formed in the second metal region that abuts the ceramic element. At the same time, use of a fine-grained metal region on the outer side has proven to be advantageous because it simplifies, for example, wire bonding and/or facilitates automated optical inspection.

Preferably, a ratio of the grain size of the first metal region to the grain size of the second metal region is less than 0.3, preferably less than 0.2 and particularly preferably less than 0.15. For example, the grain sizes assume a value below 600 µm, preferably below 300 µm and particularly preferably below 200 µm. When comparing the grain sizes, an average value, for example for at least 50 grains, will preferably be used for the first metal region and the second metal region, respectively, and that ratio will subsequently arise from the average values. Preferably, the grain sizes are determined using a line intersection method, in which the respective extension of different grains along a predetermined line will be determined. Preferably, an active metal layer and/or an active metal-including contact layer is/are to be arranged, at least in some portions, to form the metal-ceramic substrate between the container and the ceramic element, preferably between the at least one metal layer and the ceramic element and/or between the at least one metal layer and the metal ply. In this way, it is advantageously possible to promote joining of the at least one metal layer to the ceramic element. In particular, it has been found that a plane, in particular a homogeneously distributed adhesion-promoting layer may thus be realized between the at least one metal layer and the ceramic element. Furthermore, it is conceivable that an additional adhesion-promoting layer, for example an active metal layer or a solder material, will be introduced between the metal ply and the at least one metal layer to support joining of the metal ply to the at least one metal layer as part of a soldering process. It is conceivable to use a solder material the process temperature of which is below that used in hot isostatic pressing. This ensures that the metal ply of the container will also be joined to the at least one metal layer during hot isostatic pressing.

Preferably, the active metal layer and/or the active metal-containing contact layer become part of the ensemble or are part of the ensemble during joining. In other words, the ensemble will be completed by the active metal layer.

In particular, the active metal layer and/or the contact layer comprising an active metal has a percentage of active metal that is greater than 15 wt %, preferably greater than 50 wt %, and particularly preferably greater than 75 wt %. This distinguishes the layer from active metal-containing solder materials, which typically have an active metal content of up to 10% by weight.

Preferably, only one active metal layer or only one active metal is provided between the metal ply and the ceramic element. In particular, joining is carried out without a solder base material, or omitting a solder base material. Compared to joining a metal layer to a ceramic layer using a solder material, wherein temperatures below the melting temperature of the metal layer are usually used, the present method may advantageously omit a solder base material, thus an active metal is required only.

In addition, narrower isolation trenches may be realized compared to the manufacture using soldering methods, for example to an extent corresponding to the width of isolation trenches that can be achieved with substrates manufactured using DCB methods. In particular, isolation trenches can be reduced in size by about 200 μm because solder residues, which generally project up to about 200 μm into the isolation trenches when using active soldering methods, are not expected to arise. This solder residue is measured starting from the end of the etching flank in the direction of the isolation trench. The solder residue is measured as the total of the metal sections opposite each other which delimit an isolation trench in a direction parallel to the main extension plane.

Examples of an active metal include titanium (Ti), zirconium (Zr), hafnium (Hf), chromium (Cr), niobium (Nb), cerium (Ce), tantalum (Ta), magnesium (Mg), lanthanum (La) and vanadium (V). Herein, it is to be noted that the metals La, Ce, Ca, and Mg may readily oxidize. It is further to be noted that the elements Cr, Mo and W are not typically active metals, but are suitable as a contact layer between $Si_3N_4$ and the at least one metal layer or the solder system or solder material, since they do not form intermetallic phases with the at least one metal layer, for example copper, and do not have edge solubility. In particular, the solder base material omitted in the process is a metal-based base material, preferably a silver-based or a copper-based base material. In a silver-based base material, silver is the main component, i.e., the component with the highest content in terms of weight percentage, while in a copper-based base material, copper is the main component. Examples of a silver-based base material include AgCu, in particular AgCu28, AgCuIn, AgCuSn and AgCuGa. Examples of a copper-based base material include copper CuSn, CuAg, CuIn, CuGa, CuInSn, CuInMb, CuGaSn. It is also conceivable to omit a solder base material based on NiCrMn or SnCu.

Furthermore, a contact layer comprising an active metal is to be understood as a layer comprising, for example, a compound containing an active metal, such as TiN, TiC or TiO, in particular in different oxidation states or in different stoichiometric and non-stoichiometric compounds. It is also conceivable that it is an alloy comprising one or more active metals.

As an alternative to joining without the use of solder base material, it is also conceivable that between
  the active metal layer or the contact layer or the ceramic element and
  the metal layer and/or
between
  the metal layer and
  the metal ply,
  a solder base material or a solder material comprising an active metal will be arranged. This causes additional binding or the binding will reinforced. In this case, it is conceivable that joining is performed at a temperature below or above the process temperature of the solder material or solder base material. Furthermore, it is advantageous to use a solder material or a solder base material which is free of silver.

The process temperature of the solder material depends on the solder material used and is typically below 1100° C. By adding materials that lower the melting point, the temperature can be lowered to a temperature of 600° C. The solder material melts at this temperature. In this case, the solder material melts at the process temperature. In the present invention, joining between the ceramic element and the metal layer may also be carried out if the process temperature will not be reached.

Preferably, the metal ply is to be folded to form the container and/or the metal ply is to be joined to another metal ply. For example, the metal ply is wrapped around an arrangement, the arrangement comprising the at least one metal layer and the ceramic element. In particular, this folding is performed such that a first end and a second end of the metal ply protrude together to one side so that the first end and the second end of the same metal ply can be joined together to form the container. Alternatively, the metal ply and an additional metal ply are arranged on opposite sides, and their free ends projecting in the direction of the main extension plane in relation to the arrangement are joined together to form the gas-tight container. Preferably, the edge regions of the metal ply and/or the additional metal ply to be joined are joined to each other by means of laser welding and/or electron beam welding, in particular in a defined joining region. It is particularly preferred that the metal ply from of which the container is produced, which container, in turn, is a component of the metallization produced, comprises nickel, silver, stainless steel and/or titanium, and in particular is provided as a foil the first thickness of which is 0.01-1 mm. Such a thin metal ply is particularly easy to fold and join.

According to a preferred embodiment of the present invention, the container is formed of the metal ply and/or the additional metal ply. Alternatively, it could be a container, for example, in which the ensemble of ceramic element, at least one metal layer and metal ply is arranged. For example, the container is a glass container.

Another object of the present invention is a metal-ceramic substrate produced by the method according to the invention. All the properties and advantages described for the method for producing the metal-ceramic substrate may analogously be applied to the metal-ceramic substrate, and vice versa.

In particular, according to the suggested method, a metal-ceramic substrate is provided in which, due to the prevailing pressure conditions, almost no more voids occur or the number of voids or pores is reduced compared to the metal-ceramic substrates produced by an AMB or DCB method. In addition, the metal layer thickness of the metallization is constant in terms of profile, following the profile of the ceramic surface. Furthermore, the method for producing the metal-ceramic substrate allows silver-containing solder base materials to be omitted, which simplifies second etching. As a result, narrower isolation trenches may be realized, for example in a dimension corresponding to the width of isolation trenches that can be achieved in substrates manufactured by means of DCB methods. In particular, isolation trenches can be reduced in size by about 200 μm, since solder residues, which usually project up to 100 μm per side into the isolation trenches, are not to be expected to occur. This solder residue is measured starting from the end of the etch flank in the direction of the isolation trench. The solder residues are measured as the total of opposing metal sections delimiting an isolation trench in a direction parallel to the main extension plane. In addition, fringing at the boundary between the metallization and the ceramic element can be reduced, since the silver components in the solder material otherwise cause etching to be difficult to control, which is evidently manifested in fringe-like courses in a direction parallel to the main extension plane. Furthermore, the constant thickness of the metallization, which does not vary across the entire metal-ceramic substrate, allows the etching process to be similarly performed for all areas of the metal-ceramic substrate without the need of thickness modulations of the metallization. The constant thickness is achieved because the pressure used in hot isostatic pressing homogeneously presses the metallization onto the profile of the ceramic element. In addition, it is advantageously possible to achieve uniform etching flank geometry across the metal-ceramic substrate due to homogeneous material distribution in the metallization.

In particular, it is provided that the metallization and the ceramic element extend along a main extension plane and are arranged one above the other along a stacking direction extending perpendicularly to the main extension plane, a binding layer being formed between the metallization and the ceramic element in the manufactured carrier substrate, an adhesion-promoting layer of the binding layer having a sheet resistance which is greater than 5 ohm/sq, preferably greater than 10 ohm/sq and particularly preferably greater than 20 ohm/sq.

Compared to carrier substrates known from the prior art, it is provided that the sheet resistance of an adhesion-promoting layer of the binding layer is greater than 5 ohm/sq, preferably greater than 10 ohm/sq and particularly preferred greater than 20 ohm/sq. The sheet resistance determined is directly related to a proportion of the active metal in the adhesion-promoting layer or to the layer thickness of the adhesion-promoting layer, which is decisive for joining the metallization to the ceramic element. The sheet resistance increases with decreasing active metal content in the binding layer. A correspondingly high sheet resistance thus corresponds to a low active metal content in the binding layer. It has been found that with increasing active metal content, formation of brittle intermetallic phases is favored, which in turn is detrimental to the peel strength of the metallization on the ceramic element. In other words, the sheet resistances as disclosed herein provide binding layers the peel strength of which is improved, i.e., increased, due to reduced formation of brittle intermetallic phases. By selectively adjusting the sheet resistances as disclosed herein, particularly strong joining of the metallization to the ceramic element may thus be achieved.

To determine the sheet resistance, the metal layer and optionally a solder base layer are first removed from the fabricated carrier substrate, for example by etching. A sheet resistance will then be measured using a four-point measurement on the upper or lower side of the carrier substrate from which the at least one metal layer and the solder base layer have been removed.

In particular, the sheet resistance of a material sample is to be understood as the resistance thereof in relation to a square surface area. It is common to denote the surface resistance with the unit Ohm/sq. The physical unit of the sheet resistance is ohm.

Preferably, a thickness of the binding layer, as measured in the stacking direction, averaged over a plurality of measuring points within a predetermined area or in a plurality of areas which run or extend parallel to the main extension plane, is to assume a value which is less than 1 µm, preferably less than 0.7 µm and particularly preferably less than 0.5 µm. Where reference will be made to a plurality of areas, it is in particular meant that the metallization is subdivided into areas of as equal size as possible and in each of these areas subdividing the at least one metal layer, at least one value, preferably a plurality of measured values, is recorded for the thickness. The thicknesses determined in this way at different points are arithmetically averaged.

Compared with the carrier substrates known from prior art, a comparatively thin binding layer is thus formed between the metallization and the ceramic element. To determine the relevant thicknesses of the binding layer, the measured thicknesses are to be averaged over a large number of measuring points which are within a predetermined or specified area. This advantageously accounts for the fact that the ceramic element is generally subject to ondulation, i.e., the ceramic element is said to have a waviness. In particular, the person skilled in the art understands by a waviness modulation of the general flat course of the ceramic element, seen over several millimeters or centimeters along a direction running parallel to the main extension plane. Thus, such ondulation is distinct from a surface roughness of the ceramic element, which generally is present in addition on the ceramic element. By including such generally unavoidable ondulation of the ceramic element into thickness determination, it will be incorporated that the binding layer may vary due to ondulation, in particular that it may be larger in trough regions of the ceramic element than in peak regions of the ceramic element.

Irrespective of this ondulation, the averaged thickness value is nevertheless significantly lower than that known from prior art carrier substrates. This will be achieved, in particular or for example, by arranging a required active metal layer between the ceramic element and the metallization, which is in particular individually arranged, i.e., separately arranged, for example in addition to a solder base material. Preferably, the active metal is applied to the solder base material and/or the at least one metal layer and/or the ceramic element by means of chemical and/or physical vapor deposition, for example by means of sputtering, in order to realize comparatively thin active metal layers which, in turn, result in a comparatively thin binding layer, in particular in a homogeneous and thin adhesion-promoting layer. It is also conceivable to provide the active metal layer on the solder base material, the ceramic element and/or the at least one metal layer using a plasma, in a vacuum and/or by means of vapor deposition. It is also conceivable to realize the active metal layer by electroplating. It is particularly preferred that the active metal layer is provided as a foil.

Formation of comparatively thin binding layers in particular reduces the effort required to remove the binding layer again, for example in a "second etching", at least in certain areas, to pattern the carrier substrate, in particular to pattern metallization and binding layer thereof. Preferably, this patterning, which is used to electrically isolate a plurality of metal sections of the at least one metal layer from each other, is carried out by an etching and/or a mechanical treatment step and/or by means of laser light. In addition, it has proven to be advantageous that by using low layer thicknesses, the number of possible defects in the binding layer, for example caused by material defects in the solder material, may advantageously be reduced. For example, a defect in the binding layer or a material defect in the solder material is to be understood as a large grain in the solder material, for example a paste, such as an active metal grain, which can lead to the formation of a giant grain in the binding layer, and/or which does not melt completely and thus prevents minimal solder gaps from occurring as it acts as a spacer. Application, in particular by means of sputtering, is a simple way of preventing comparatively large grains from becoming part of the active metal layer and in particular of the subsequent binding layer. Finally, it is advantageous that a thin binding layer homogeneously forms over the produced carrier substrate.

It is particularly preferred to use the following method to determine and select the measuring ranges contributing to the determination—irrespective of the size of the carrier substrate:

In a first step, the at least one metal layer of the carrier substrate is divided into nine rectangles of equal size, in particular squares, i.e., into several areas. Two or three sectional views are generated in each of the measurement ranges thus defined, which are used to determine an averaged thickness for the metallization in each of the sectional views. The sectional views are preferably produced using a SEM process, for example at a magnification greater than or equal to 5000 times, which is to be set for the SEM device. Subsequently, in a second step, an average is taken over the total of 18 or 27 averaged thicknesses recorded in the sectional views, which are distributed over all nine rectangular measuring areas. In this way, it is advantageously ensured that the averaged thickness is a representative value for the binding layer between the metallization and the ceramic element. In other words, the procedure described in the section provides for averaged thicknesses determined over the metallization as seen in uniformly distributed measuring ranges. The procedure described herein for selecting the measurement ranges that contribute to the determination of an averaged value for the thickness is to be used analogously for the determination of the sheet resistance.

Preferably, the binding layer and/or the further binding layer is to be an adhesion-promoting layer comprising an active metal. In particular, the binding layer is to be formed only of the adhesion-promoting layer comprising the active metal. In this case, the adhesion-promoting layer in the binding layer has a bond with a constituent of the ceramic element, such as nitrogen, oxygen, or carbon, and the other constituents of the ceramic. Correspondingly, the adhesion-promoting layer comprises, for example, titanium nitride, titanium oxide, and/or titanium carbide. In this case, a thickness of the binding layer measured in the stacking direction averaged over a plurality of measurement points within a surface parallel to the main extension plane, or the plurality of surfaces, is to assume a value smaller than 0.003 mm, preferably smaller than 0.001 mm, and particularly preferably smaller than 0.0005 or even smaller than 0.0004 mm. In particular for those binding layers in which a solder base material and/or a silver component is omitted, an even thinner binding layer may correspondingly be formed.

Figure 1B:
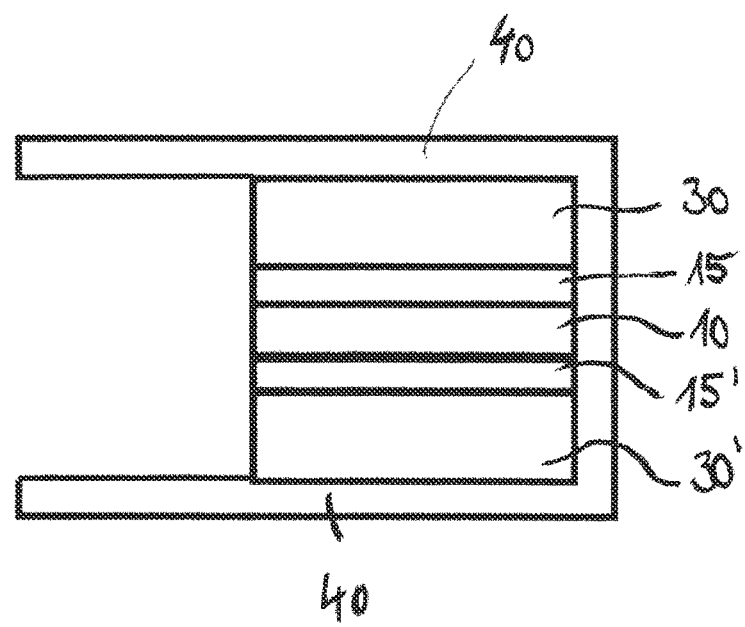
Figure 1C:
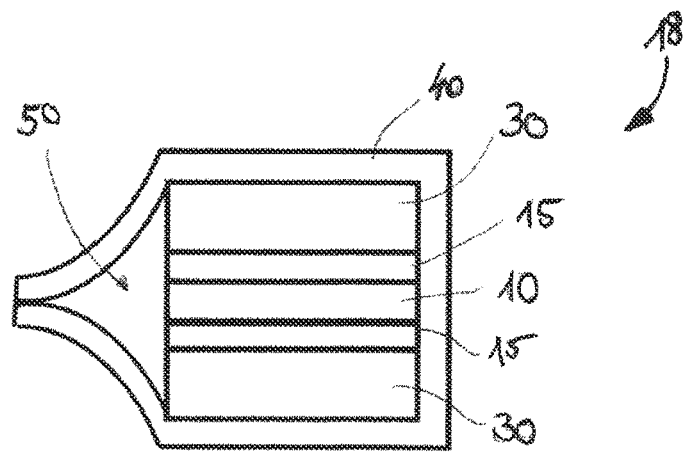
Figure 1D:
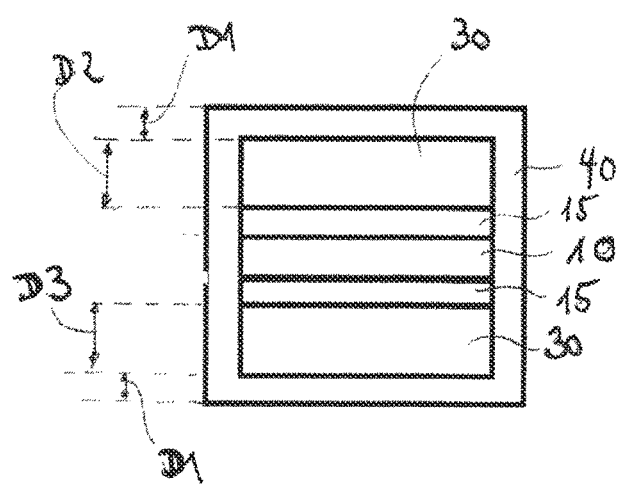
Figure 1E:
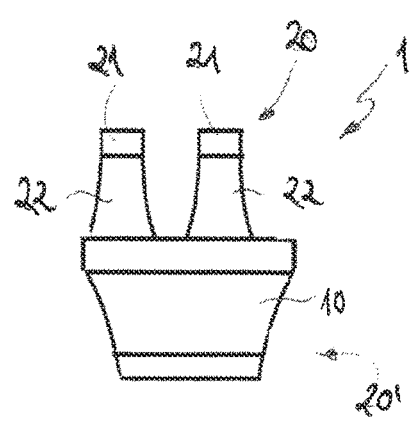

FIGS. 1a to 1e show a method for producing a metal-ceramic substrate 1 according to a first example embodiment of the present invention, wherein FIG. 1e shows the fabricated metal-ceramic substrate 1. Such metal-ceramic substrates 1 preferably serve as a carrier or printed circuit board for electronic or electrical components which can be joined to a metallization 20 of the metal-ceramic substrate 1. It is preferred that the metallization 20 is being patterned to form appropriate conductor tracks and/or conductor junction areas. The metallization 20 substantially extending along a main extension plane HSE and the ceramic element 10 are thereby arranged on top of each other along a stacking direction S perpendicularly extending to the main extension plane HSE, and are preferably joined or bonded to each other. Preferably, the metal-ceramic substrate 1, in addition to the metallization 20, comprises a backside metallization or additional metallization 20', which, as seen in the stacking direction S, is arranged and joined to the side of the ceramic element 10 opposite the metallization 20. The additional metallization 20' and/or an additional cooling element, for example, in particular are used to counteract bending of the metal-ceramic substrate 1 and/or to dissipate a heat input caused by electrical or electronic components on the metal-ceramic substrate 1. An example of the fabricated metal-ceramic substrate 1 with the patterned metallization 20 is shown in FIG. 1e.

In the method for producing such a metal-ceramic substrate 1 shown schematically in FIGS. 1a-1e, first the ceramic element 10, a metal ply 40 and at least one metal layer will initially be provided. In this context, it is preferred that an active metal layer 15 is arranged between the ceramic element 10 and the at least one metal layer 30. In particular, the active metal layer 15 is arranged between the ceramic element 10 and the at least one metal layer 30, as viewed in the stacking direction S. Furthermore, it is preferred that at least one additional metal layer 30' and one additional active metal layer 15' are provided, wherein the additional active metal layer 15' is arranged between the at least one additional metal layer 30' and the ceramic element 10, as viewed in the stacking direction S. In this context, it is preferred that the metal ply 40 has a first thickness D1, the at least one metal layer 30 has a second thickness D2 and the at least one additional metal layer 30' has a third thickness D3. It is particularly preferred that the second thickness D2 and the third thickness D3 are approximately equal to each other. It is also conceivable that the third thickness D3 is greater than the second thickness D2 or vice versa. With a correspondingly larger third thickness D3, it may be ensured that sufficiently high heat capacity is provided to serve as a buffer in overload situations for the thermal dissipation of heat, in the fabricated metal-ceramic substrate 1 by providing an appropriately formed additional metallization 20'.

In the example shown in FIG. 1a, an arrangement 50 comprising the at least one metal layer 30, the active metal layer 15, the ceramic element 10, the additional active metal layer 15' and the at least one additional metal sheet 30' is placed onto the metal ply 40.

In the subsequent process step, the metal ply 40 is folded such that it encases or surrounds the arrangement 50 of metal layer 30, additional metal layer 30', active metal layer 15, additional active metal layer 15 and ceramic element 10. In particular, the embodiment of FIG. 1b shows that the metal ply 40 is folded or wrapped around the arrangement 50 such that a first end and a second end of the metal ply 40 protrude to a same side, as seen from the arrangement 50. In other words, the metal ply 40 is dimensioned such that the first end and the second end of the metal ply 40 protrude to a same side when wrapped around the arrangement 50, particularly at a side opposite a fold. When the metal ply 40 is folded, it In particular has three open, preferably protruding, first and second ends of the metal ply 40. In particular, the first end and the second end of the metal ply 40 protrude from the arrangement 50 such that the first and second ends of the metal ply 40 can be joined together. This is exemplified in FIG. 1c, in which an ensemble 18 is formed in which the arrangement 50 comprising the at least one metal layer 30, the active element 15, the ceramic element 10, the additional active metal layer 15', and the at least one additional metal sheet 30' is encased by a container of the metal ply 40. By means of electric beam welding or laser beam welding, the first and the second end of the metal ply 40 are bonded or joined to each other, in particular forming a gas-tight container, in which the metal ply 40 surrounds or encloses the arrangement 50, in particular forming a continuous planar contact between the metal ply 40 and the individual constituents and components of the arrangement 50, which is arranged within the container.

Preferably, a vacuum is provided in the gas-tight container. Alternatively, it is conceivable that residual air remains in the gas-tight container or that a defined gas atmosphere is present, for example nitrogen. This ensemble 18, in which the arrangement 50 is positioned within the gas-tight container, is then subjected to hot isostatic pressing to realize joining of the metal ply 40 and the at least one metal layer 30 onto the ceramic element 10. In particular, it has been found that both joining the at least one metal ply 30 to the ceramic element 10 and additionally joining the metal ply 40 to the at least one metal ply 30 is realized during the hot isostatic pressing. In this way, the metal ply 40 of the container becomes part of the subsequent metallization 20 on the metal-ceramic substrate 1. The procedure of using an additional metal ply 40, which is used in addition to the at least one metal layer 30, has proven to be advantageous in particular because it thereby becomes possible to use comparatively thin first thicknesses D1 of the metal ply 40. This considerably simplifies formation of the gas-tight container. Furthermore, the use of a different metal ply 40 in addition to the at least one metal layer 10 allows the metallization 20 to be formed of two different metals and/or metal configurations.

In particular, a first metal region 21 and a second metal region 22 are formed following joining, the first metal region 21 being due to the metal layer 40 and the second metal region 22 being due to the at least one metal layer 30. Preferably, a ratio of a first thickness D1 of the metal ply 40 to a second thickness D2 of the at least one metal layer 30 takes a value between 0.01 and 2, preferably between 0.1 and 2 and more preferably between 0.15 and 0.5 or 2. It has also been found that particularly good results have been obtained for first thicknesses D1 between 0.2 and 0.3 mm, in particular when a ratio of a first thickness D1 of the metal ply 40 to a second thickness D2 of the at least one metal layer 30 assumes a value between 0.01 and 0.5, preferably between 0.1 and 0.5 and particularly preferably between 0.15 and 0.5 or 0.5. Following joining, which is performed in particular as part of a hot isostatic pressing process, it is preferred to provide the metal ply 40 and the at least one metal layer 30 that have been joined to the ceramic element 10 with patterning by means of laser light, by means of etching and/or by means of mechanical machining. As a result, metal sections isolated from each other are formed in the metallization 20. In FIG. 1e, for example, curved or bent etching edge profiles may be seen which are formed on both the metallization 20 and the backside metallization 20'. The so-called isolation trenches realized by patterning serve to impart a suitable function as a conductive path and/or conductor junction area to the metal sections bonded to the ceramic element 10.

Figure 2:
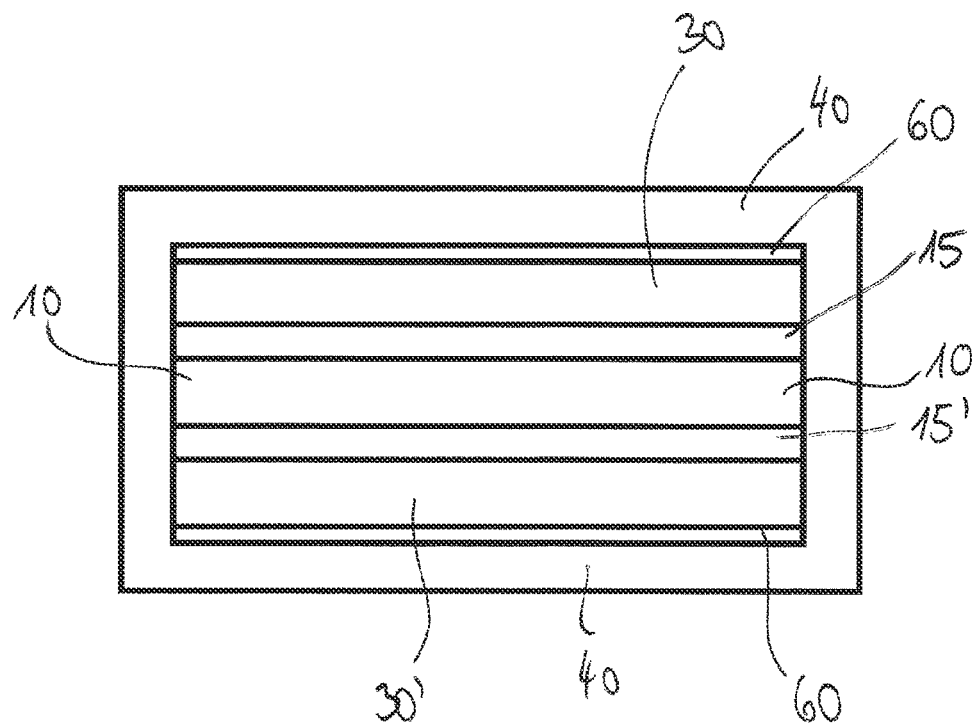
FIG. 2 is a schematic representation of a container for a process according to a third example embodiment of the present invention.

FIG. 2 is a schematic representation of a container for a process according to a third exemplary embodiment of the present invention. Herein, FIG. 2 shows the arrangement of metal ply 40, the at least one metal layer 30 and the ceramic element 10 prior to or during hot isostatic pressing (such as FIG. 1c). Herein, the example embodiment in FIG. 2 differs from the ensemble of FIGS. 1a to 1e in that a functional layer 60 is arranged between the metal ply 40 and the at least one metal layer 30, which preferably serves as a diffusion barrier between the at least one metal layer 30 and the metal ply 40. This has the effect, for example, that the metal ply 40 and the at least one metal layer 30 will remain separated from each other during joining in hot isostatic pressing. In this case, the functional layer 60 extends over the entire surface or completely between the at least one metal ply 30 and the metal layer 40.

LIST OF REFERENCE NUMBERS

1 Metal ceramic substrate
10 Ceramic element
15 Active metal layer
15' Additional active metal layer
18 Ensemble
20 Metallization
20' Additional metallization
21 First metal region
22 Second metal region
30 Metal layer
30' Additional metal layer
40 Metal ply
50 Arrangement
60 Functional layer
D1 First thickness
D2 Second thickness
D3 Third thickness
S Stacking direction
HSE Main extension plane

The invention claimed is:

1. A method for producing a metal-ceramic substrate (1), comprising:
   providing a ceramic element (10), a metal ply (40), and at least one metal layer (30), wherein both the metal ply and the at least one metal layer are made from copper respectively,
   forming an ensemble (18) of the ceramic element (10), the metal ply (40), and the at least one metal layer (30),
   forming a gas-tight container surrounding the ceramic element (10), wherein the at least one metal layer (30) is arranged between the ceramic element (10) and the metal ply (40) in the container; and
   forming the metal-ceramic substrate (1) by hot isostatic pressing, wherein for forming the metal-ceramic substrate (1) between the at least one metal layer and the ceramic element (10), only an active metal layer (15) is arranged without a solder material and wherein the metal layer and the metal ply becomes part of the metallization in the metal ceramic substrate during the hot isostatic pressing.

2. The method according to claim 1, wherein the metal ply (40) is thinner than the at least one metal layer (30).

3. The method according to claim 1, wherein a ratio (D1/D2) of a first thickness (D1) of the metal ply (40) to a second thickness (D2) of the at least one metal layer (30) assumes a value between 0.01 and 2.

4. The method according to claim 1, wherein the metal ply (40) is thicker than the at least one metal layer (30).

5. The method according to claim 1, wherein, when forming the metal-ceramic substrate (1), an atmosphere free of oxygen is present in the container.

6. The method according to claim 1, wherein the first thickness (D1) assumes a value between 10 µm and 500 µm.

7. The method according to claim 1, wherein the second thickness (D2) assumes a value between 100 µm and 10,000 µm.

8. The method according to claim 1, wherein the metal ply (40) and/or the at least one metal layer (30) is designed such that, different grain sizes will be established in the fabricated metal-ceramic substrate (1).

9. The method according to claim 1, wherein the active metal layer (15) and/or the contact layer comprising an active metal has a percentage of active metal greater than 15 wt. %.

10. The method according to claim 1, wherein the metal ply (40) is folded to form the container and/or the metal ply (40) is joined to an additional metal ply.

11. The method according to claim 1, further comprising inserting a functional layer (60) between the metal layer (30) and the metal ply.

12. A metal-ceramic substrate (1) produced by a method according to claim 1, wherein the metal ply (40) and/or the at least one metal layer (30) are configured such that different grain sizes occur in the fabricated metal-ceramic substrate (1), wherein a first metal region (21) formed of the metal ply (40) has a smaller grain size than a second metal region (22) formed of the at least one metal layer (30).

13. The method according to claim 8, wherein a first metal region (21) of the metallization (20), which is formed of the metal ply (40), has a smaller grain size than a second metal region (22) of the metallization (20), which is formed of the at least one metal layer (30).

14. The method according to claim 11, wherein the functional layer (60) comprises a diffusion barrier.

15. The method according to claim 13, wherein a ratio of the grain size of the first metal region (21) to the grain size of the second metal region (22) is smaller than 0.3.

\* \* \* \* \*